(12) United States Patent
Soryal

(10) Patent No.: US 11,677,980 B2
(45) Date of Patent: Jun. 13, 2023

(54) IMAGE COMPRESSION AND DECOMPRESSION VIA RECONSTRUCTION OF LOWER RESOLUTION IMAGE DATA

(71) Applicant: AT&T Intellectual Property I, L.P., Atlanta, GA (US)

(72) Inventor: Joseph Soryal, Glendale, NY (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 175 days.

(21) Appl. No.: 17/342,099

(22) Filed: Jun. 8, 2021

(65) Prior Publication Data

US 2022/0394292 A1 Dec. 8, 2022

(51) Int. Cl.
*H04N 19/597* (2014.01)
*G06T 9/00* (2006.01)
*G06F 18/21* (2023.01)

(52) U.S. Cl.
CPC ........... *H04N 19/597* (2014.11); *G06F 18/21* (2023.01); *G06T 9/002* (2013.01)

(58) Field of Classification Search
CPC ........ H04N 19/597; G06F 18/21; G06T 9/002

USPC .................................................... 375/240.02
See application file for complete search history.

(56) References Cited

U.S. PATENT DOCUMENTS

2020/0300764 A1* 9/2020 Gerlach ............... G01N 33/582
2021/0321081 A1* 10/2021 Appelgate ........... H04N 19/597

* cited by examiner

*Primary Examiner* — Allen C Wong
(74) *Attorney, Agent, or Firm* — Amin, Turocy & Watson, LLP

(57) ABSTRACT

The technology is directed towards image compression and decompression, including for 3D images. A sender device obtains lower resolution sub-images of an original image, captured from different angles. The sender device uses different neural network candidate level data and groups of candidate sub-images to determine selected neural network level data and sub-images that when combined, reconstruct the original image that satisfies a function of quality loss data, for sending to a receiver device. The receiver device receives the neural network level data, the group of sub-images and the reconstruction data, and reconstructs a three-dimensional representation of the original image using the neural network level and the group of sub-images arranged based on the reconstruction data.

20 Claims, 13 Drawing Sheets

IMAGE COMPRESSION AND DECOMPRESSION VIA RECONSTRUCTION OF LOWER RESOLUTION IMAGE DATA

TECHNICAL FIELD

The subject application relates to image processing in general, and more particularly to compression and decompression of high resolution images, including three-dimensional images, and two-dimensional and/or three-dimensional video frames.

BACKGROUND

Transmitting frames of high resolution video data, as well as 3D image data, consumes significant bandwidth. The needed bandwidth may not always be available, particularly as more and more people work remotely, attend school remotely, exchange high resolution image and video data for various reasons, and so on. Insufficient bandwidth can lead to lost information, skipped image frames, jittery image frames and/or pixilation of image frames and so on, resulting in a poor user viewing experience.

Transmitting high resolution three-dimensional (3D) images as well as 2D and 3D video frames is becoming more popular. At the same time, the resolutions of device displays are getting higher and higher. Standard bit stream compression techniques, executed on the bit level, are not currently adequate in many lower bandwidth scenarios.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
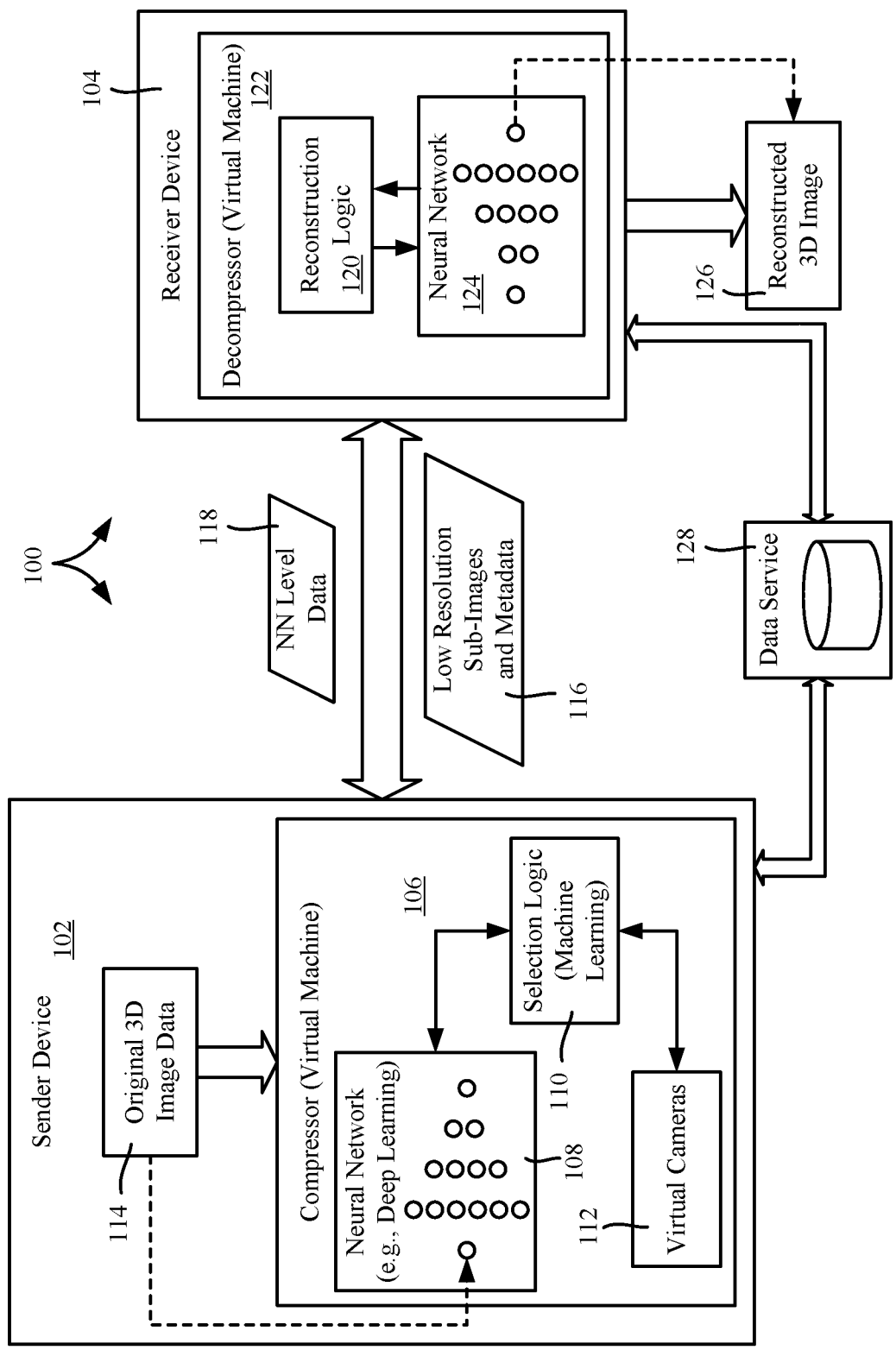
FIG. 1 illustrates an example block diagram of a system configured for image compression and decompression, in accordance with various aspects and embodiments of the subject disclosure.

The technology described herein is generally directed towards an image compressor and decompressor, where an original image can be a two-dimensional (2D) video frame, three-dimensional (3D) video frame, or 3D image. The image compressor is based on deep learning that determines how a group of low-resolution images can be combined to reconstruct an original higher resolution image.

In general as will be understood, a sender device selects and transmits a group of low-resolution images, along with image metadata and (deep learning) neural network level data, to a receiver device; the neural network level data provides information about how many times the original image was compressed and how it was retrieved by the sender, whereby the receiver can repeat the same operations. The sender device determines how many and which low resolution pictures can be used to reconstruct the original image, where in general, the number of low resolution pictures used depends on the lowest percentage of quality loss of the original image.

The receiver device uses the low-resolution images, image metadata and neural network level data to reconstruct the original image to an (agreed-upon with the sender) resolution loss. Overall, the amount of data transmitted with the compression and decompression technology described herein is less than transmitting the original higher resolution 3D image, (relative to a compressed version of the higher resolution 3D image using standard bit level compression), resulting in less needed bandwidth. Indeed, the computing power of the sender device and the receiver device are leveraged to reduce the amount of transmitted data.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

FIG. 1 is an example block and dataflow diagram showing a system 100 comprising a sender device 102 and a receiver device 104. In general and as will be understood, the sender device 102 obtains a specified resolution/level of loss from the receiver device 104, such as to send image data that allows the receiver device 104 to reconstruct an original image from the received image data with N percent (or less) loss level. Lossless (or nearly lossless) can be specified as well.

In one implementation, the sender device 102 can predetermine whether the receiver device 104 is capable of reconstructing the original images (e.g., frames of video) fast enough given the specified resolution/loss percentage. For example, as part of the initial communications between the sender device 102 and the receiver device 104, the receiver device 104 can transmit its processor type information and amount of available memory to the sender device 102. Alternatively, the information can be looked up by the sender device 102 in a data store, e.g., the receiver device is a model K smartphone and therefore should be able to reconstruct original images of resolution L at M frames per second at the specified N percent loss. Further, the sender device 102 can emulate the receiver device 104, and does so to select the image data and metadata needed for image reconstruction to the specified loss level; if the emulation is unable to operate fast enough, the receiver device will likely be unable to as well. In any event, the sender device 102 may need to negotiate lower resolution data/higher loss percentage with the receiver device 104; (currently available bandwidth may also be a factor, such as if very low).

As shown in FIG. 1, a compressor 106 such as a virtual machine (application program) in the sender device 102 includes a neural network (e.g., deep learning model) 108 coupled to selection logic 110, e.g., comprising a machine learning process. The deep learning model can be any deep learning model suitable for image compression, such as one of the deep learning models for image compression that are publically available. Note that existing image compression technology can compress an image via X compression rounds/hidden layers to a point where the original image can be decompressed (retrieved/restored) at a receiver by the same X rounds/hidden layers. However, with existing image compression technology in general, each layer corresponding to the number of compression rounds can reduce the resolution, resulting in an image that is generally not retrievable beyond a certain level of compression rounds.

In contrast, the image compression technology as described herein can reduce an image more times, including to a point that the image is not retrievable by existing multi-layered schemes, yet is retrievable by combining reduced resolution images taken from multiple angles along with a neural network multi-level compression/decompression scheme. To this end, the compressor 106 can provide data corresponding to a 3D image using virtual cameras 112 that capture lower resolution images of a three-dimensional image, in conjunction with neural network image compression and decompression concepts.

For purposes of explanation herein, compression and decompression of a 3D image is described, whether 3D images of a scene (or object) captured from various 3D angles, or an image that is a frame of a series of video frames, including for 3D video. As is understood, the technology described herein works with 2D images as well, including 2D frames of video.

Note that to obtain original 3D image data 114, the sender device 102 can be used to capture one or more high resolution images of an image, or be coupled to one or more physical cameras that capture the high resolution image data. Alternatively, the images may be static images obtained (e.g., downloaded or read) from a suitable data store. In any event, the sender device 102 obtains the original (e.g., 3D) image data 114

As will be understood, based on groups of low resolution sub-images, in conjunction with the neural network 108, the selection logic 110 determines which group of low-resolution images can be reconstructed into the original high resolution image 114 within the specified loss percentage limit. To this end, in one implementation the selection logic 110 basically uses a trial-and-error approach along with emulation of the receiver device operations.

Initially the trial-and-error approach can start with a first neural network level and a group of sub-images comprising lower resolution images, e.g., taken at a significantly lower resolution. At each neural network level, the compressor 106, e.g., the selection logic 110, emulates the receiver device 104 to reconstruct the original image and examine the output to see if the reconstructed image meets an acceptable (e.g., the receiver device-specified) compression level. If not, additional sub-images can be input at the current level and so on, and/or with the neural network level increased, such as when a full group of sub-images was tried at the current level. Additional sub-images can be captured if a level limit is reached.

Once the reconstructed image meets the acceptable compression level, the selected group of low resolution sub-images along with their reconstruction metadata (block 116), such as an angle (coordinates) of each sub-image, possibly an overlaying ordering and so on used to reconstruct the original image from the sub-images, is sent to the receiver device 104. Other data is sent from the sender device 102 to the receiver device 104, including the neural network level data (block 118), comprising information about how many times the original image was compressed, and how it was decompressed at the sender.

Once received, reconstruction logic 120 in a decompressor 122 (e.g., a virtual machine) of the receiver device 104 uses the level data, low resolution sub-images and sub-images' metadata to output a reconstructed (e.g., 3D) image 126. Note that the sub-images can be further compressed before sending (e.g., at the bit level), as long as the sender device's emulation considers this and emulates the bit-level decompression so that the resultant image meets the receiver-specified/agreed upon quality criterion.

As described below, anything learned during the compression/emulation can be preserved by the sender device in a (e.g., backend) data service 128 for subsequent use. Similarly, anything learned during the reconstruction can be preserved. Multiple sender devices and receiver devices are able to access the data service 128, whereby certain shortcuts or the like can be leveraged by accessing the data service 128 for subsequent compression and decompression operations.

Figure 2:
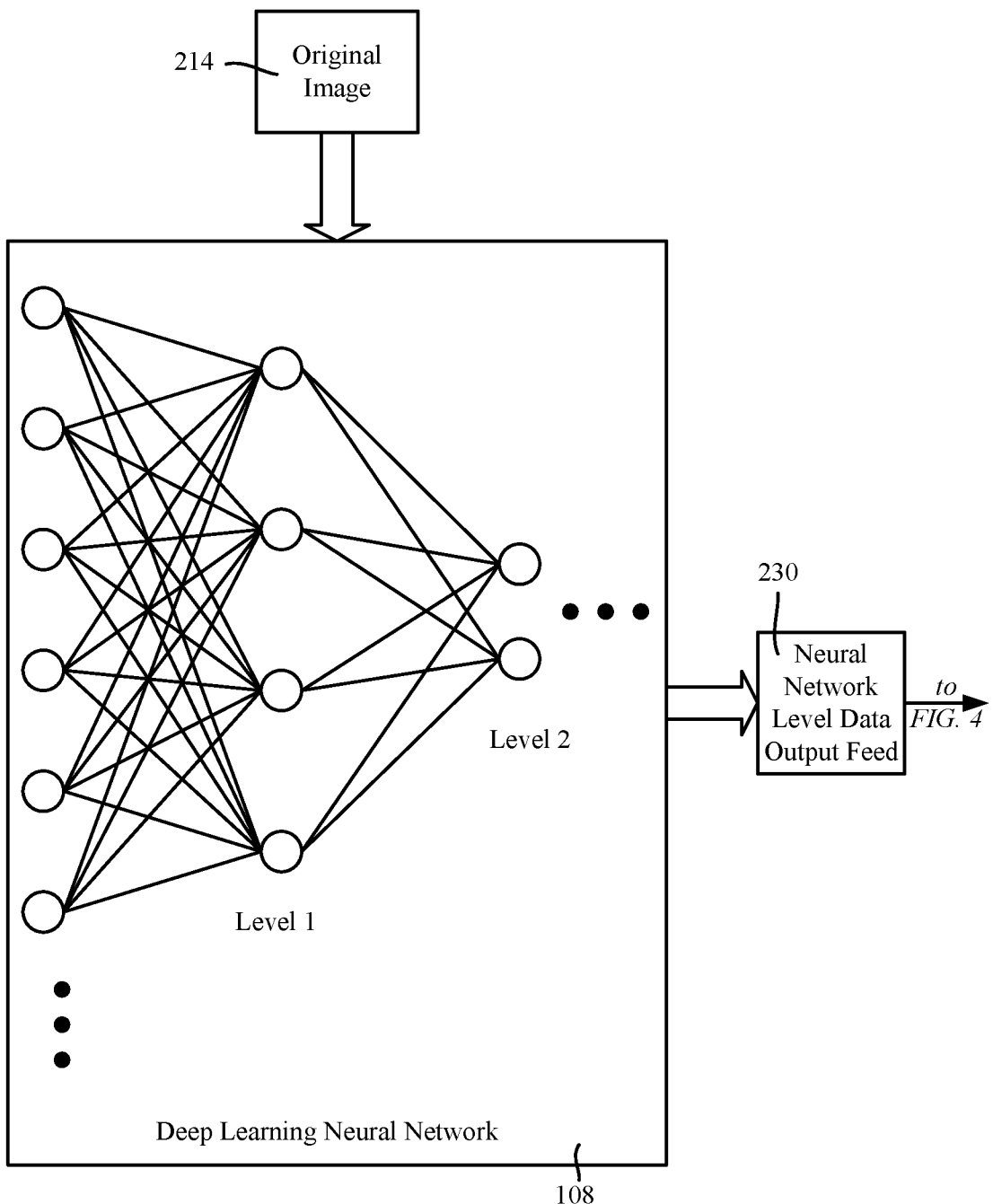
FIG. 2 is a representation of a neural network part of the compression components of a sender device, in accordance with various aspects and embodiments of the subject disclosure.

FIG. 2 shows a first feed from the neural network 106. In one implementation, an original (e.g., 3D) image 214 gets dissected by a deep learning and backpropagation process to determine the lowest level of specified loss. The level data 230 is output as a feed to selection logic 110 (FIGS. 1 and 4) as described herein.

Figure 3:
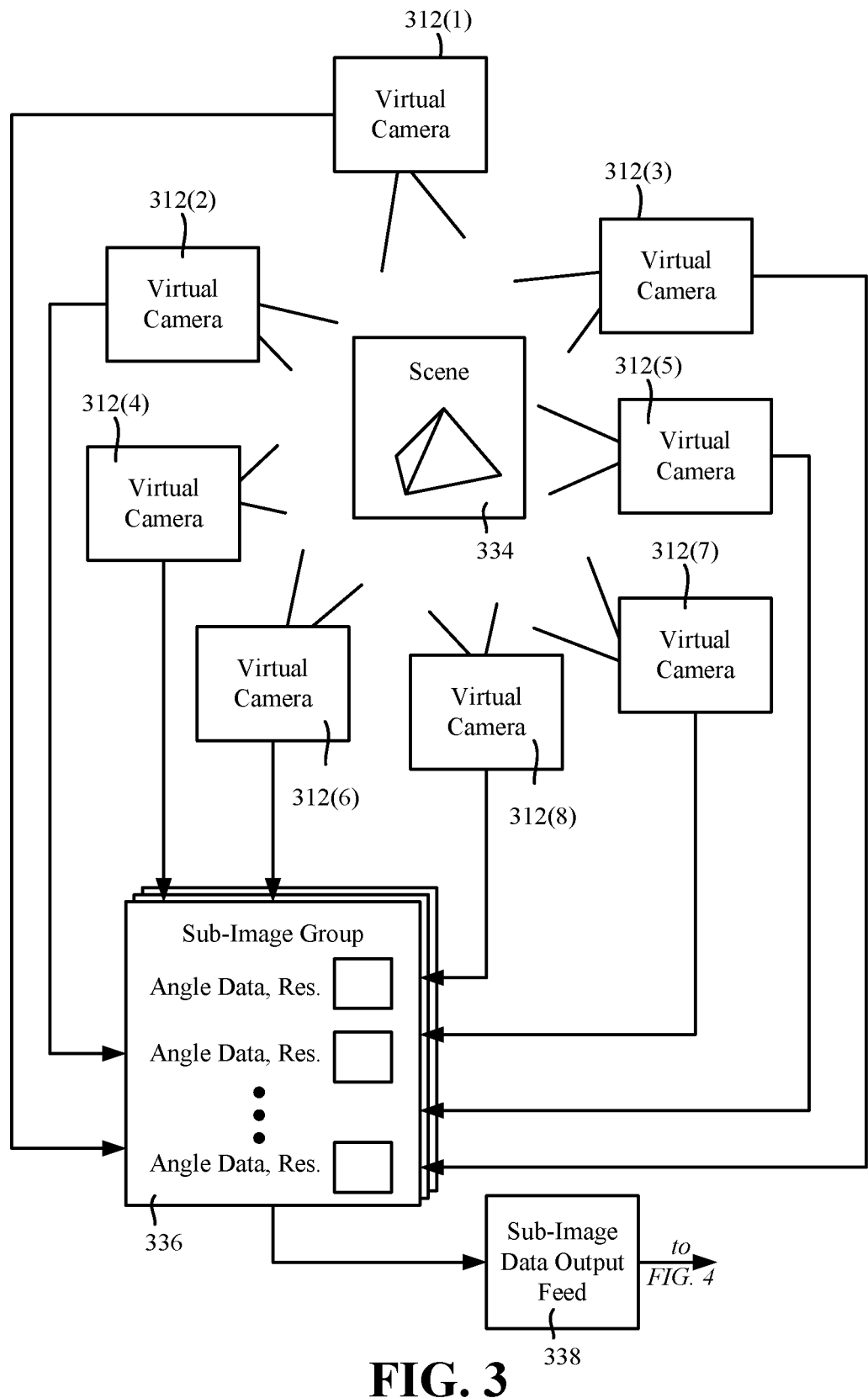
FIG. 3 is a representation of a virtual cameras part of the compression components of a sender device, in accordance with various aspects and embodiments of the subject disclosure.

FIG. 3 shows a scene 334, corresponding to the original image 214 of FIG. 2, being captured by virtual cameras 312(1)-312(8) of the compressor/virtual machine 106 (FIG. 1), basically forming a hologram in the virtual machine 106. Although eight such virtual cameras 312(1)-312(8) are shown in the example of FIG. 3, it is understood that any practical number of such virtual cameras can be instantiated and used to capture sub-image groups (block 336). The angle and the resolution (e.g., lower than the source image resolution) used for each virtual camera in each sub-image grouping is retained in conjunction with the sub-images; the sub-images and their metadata (block 338) of each sub-image grouping is another output feed used by the selection logic 110 (FIGS. 1 and 4).

Figure 4:
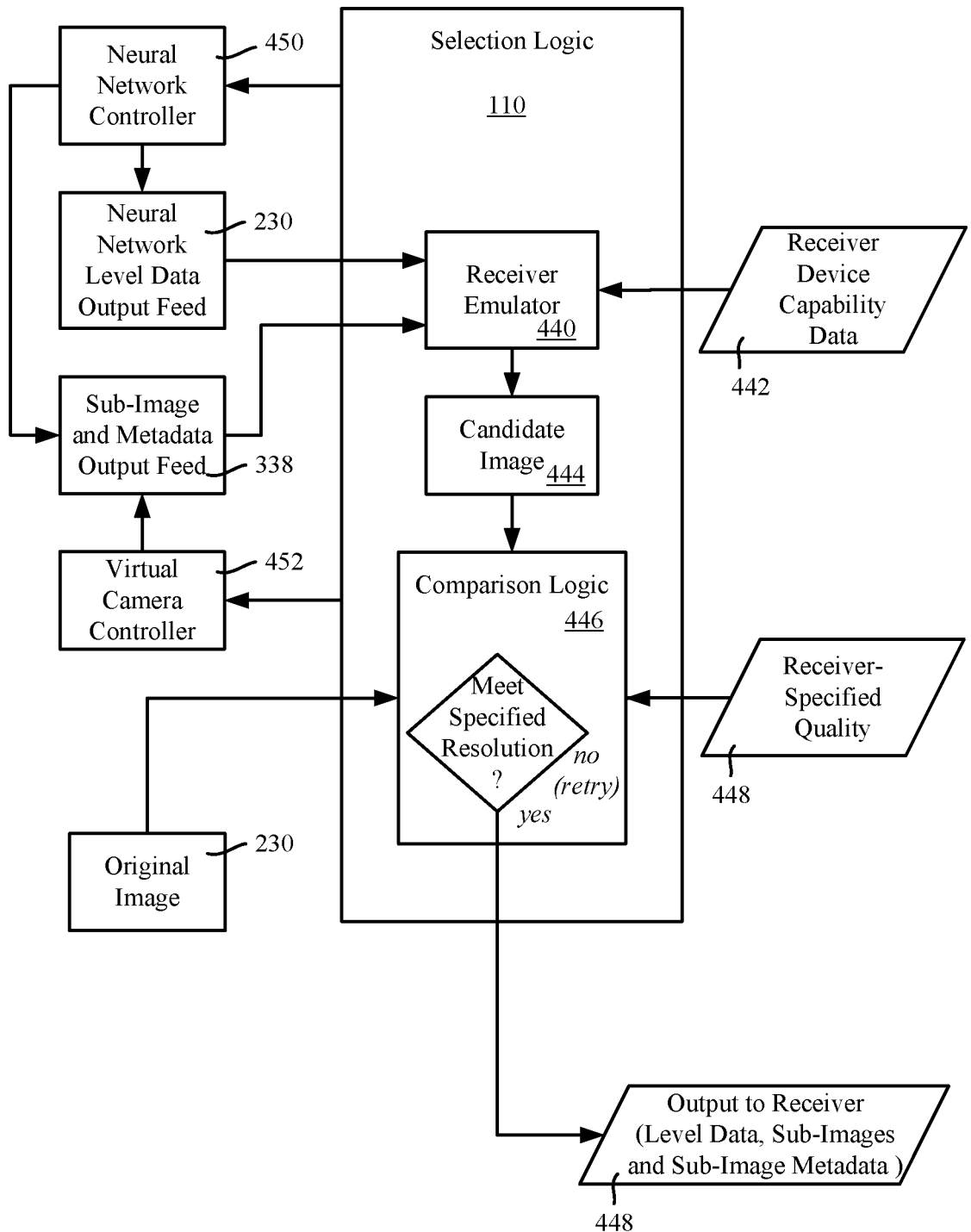
FIG. 4 is an example representation of selection logic of the compressor that determines information needed for image decompression, in accordance with various aspects and embodiments of the subject disclosure.

As shown in the example of FIG. 4, the selection logic 110 comprises a receiver emulator 440 which, based on the capability data 442 of the receiver device 104, emulates the receiver device 104 to generate a candidate image 444 based on the neural network level data output feed 230 (from FIG. 2) and the sub-image data output feed 338 (from FIG. 3). Comparison logic 446 evaluates the candidate image 444 with the original image 448 to determine if the specified loss level is met. If not, the selection logic 110 can retry with different data to obtain a different candidate image, such as by selecting additional (or a different subset of the sub-images), or can instruct a controller 450 of the neural network to increase to a next level of compression. If needed, the selection logic 110 can instruct a controller 452 of the virtual cameras to take one or more additional sub-images, such as, for example, an additional sub-image from a slightly different angle relative to those in the sub-image groups.

When the desired resolution is met by a candidate image, the selection logic 110 outputs the relevant information (e.g., the sub-images used, their angles, the neural network level data and so on) for sending to the receiver device 104. With the relevant information, the receiver device 104 can reconstruct the selected candidate image, which is the original image at no more than the specified acceptable loss.

Figure 5:
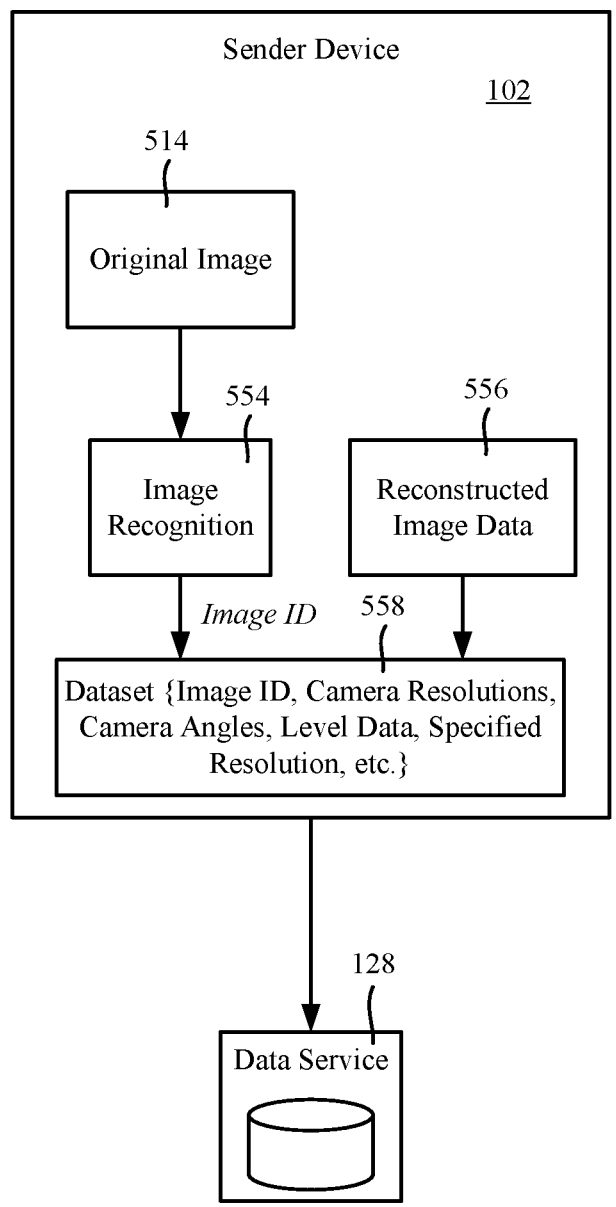
FIG. 5 is an example representation of a sender device providing image reconstruction information to a data service/data store, in accordance with various aspects and embodiments of the subject disclosure.

As set forth above, another aspect of the technology allows the information learned by the sender device 102 to be reused going forward. For example, as shown in FIG. 5, consider that an original image 514 is of a car. Image recognition 555 can be used to classify the image 514 with an identifier (ID) as type "car", possibly with additional information such as color, make, model, year and so forth if recognized as such. An identification scheme can be defined, e.g., the first j bits specify type, the next k bits identify color, the next l bits specify sub-type, and so on. The reconstructed image data 556 (e.g., the metadata and level data) can be combined with the image identifier into a dataset 558 that is stored with the data service 128.

In this way, for example, consider that another 3D image of a car is to be sent to a receiver device. A subsequent sender (not necessarily the same sender as the sender that generated the dataset 558) can perform image recognition to recognize the image, look it up via its type and any other information, and obtain a matching dataset, including a dataset that matches the receiver-specified loss level. Thus, for example, instead of having to start at neural network level 1 with speculated camera resolutions and/or angles, the subsequent sender can start at (or near) level 4, take the same (e.g., 12) number of virtual camera sub-images at saved angles and/or resolutions, and evaluate whether the generated image is sufficient to send to the corresponding receiver device.

A receiver device can likewise utilize the data service 128; e.g., to note that a green cone in a sub-image at resolution X, angle Y is a tree. The receiver or sender can thus store sub-image information as well. A sender device can also send codes or the like such as clues to a receiver device, e.g., the image identifier(s) for an image or sub-parts of an image can be provided to the receiver device.

Figure 6:
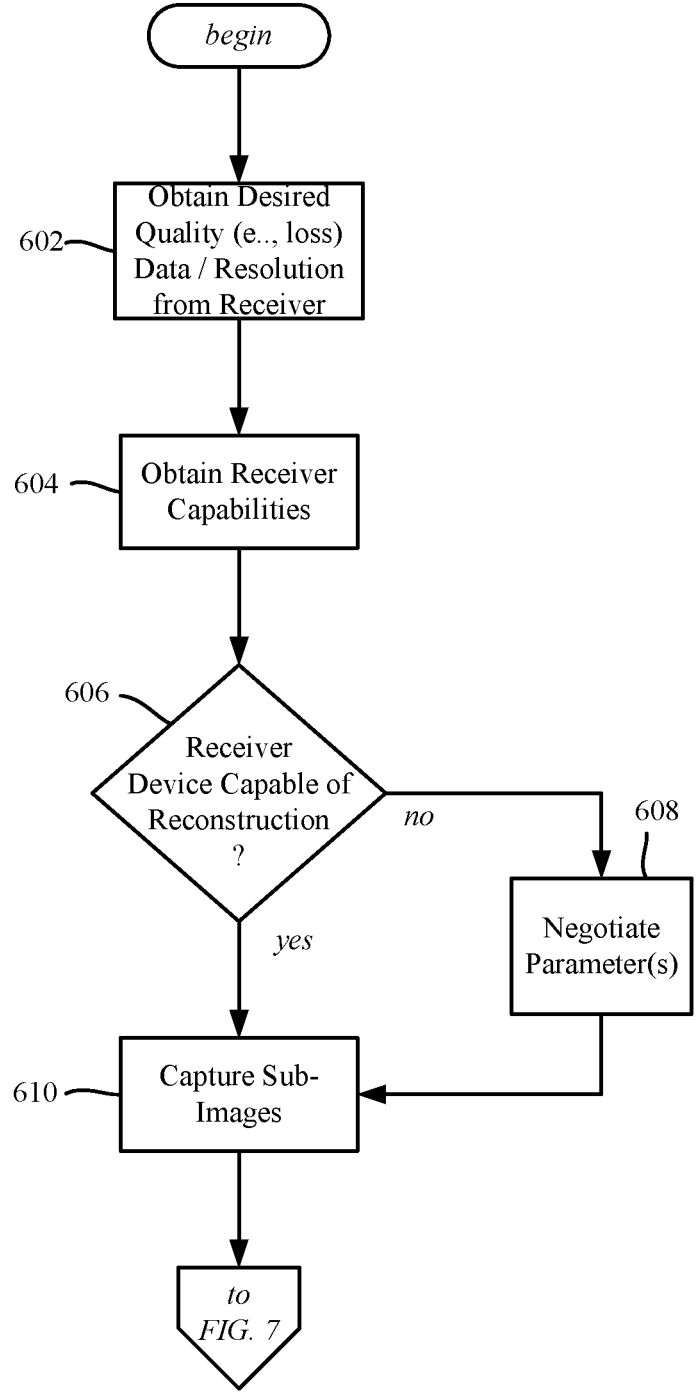
FIGS. 6-8 comprise a flow diagram representing example operations related to image compression, in accordance with various aspects and embodiments of the subject disclosure.

FIG. 6 shows general, example operations of a sender device, beginning at operation 602 where the sender device obtains a specified (desired) quality loss value (e.g., maximum ten percent loss/ninety percent quality) from a receiver device. Operation 604 represents the sender device obtaining the receiver capabilities. The sender device can then decide at operation 606 whether the receiver device is capable of receiving and reconstructing the sub-images, such as at an appropriate frame rate. For example, the sender device may know (e.g., by accessing a database) that a device type Q is not able to receive and reconstruct thirty frames per second video images above eighty-five percent quality/fifteen percent loss Image size/screen size and resolution can be considered as well. If not capable, then further negotiation can occur as represented by operation 608, e.g., including user prompts, warnings or the like. Although not explicitly shown in FIG. 6, available bandwidth can also be considered as part of the capabilities, negotiations and the like.

When the specified resolution/loss data is known or agreed upon, the sender captures the sub-images at operation 610; (if not already available). The sub-images can be captured for various resolutions and angles, although it is feasible to start with lower resolution images and only increase the resolutions if needed.

Figure 7:
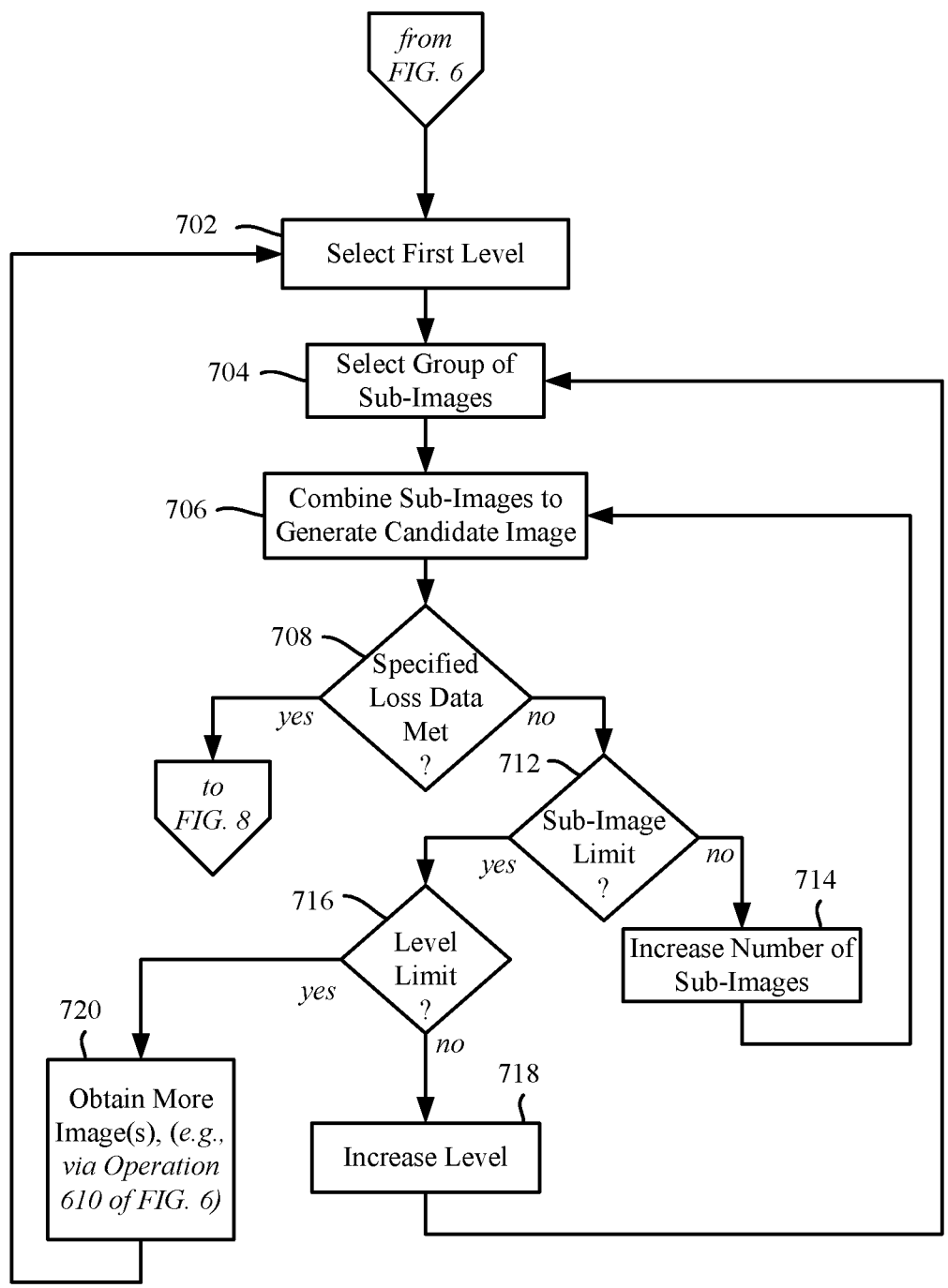

FIG. 7 shows example operations of the selection logic of the compressor, starting at the first neural network level at operation 702. As described above, it is feasible to access the data service 128 (FIG. 1) to obtain information regarding a known type of image and thereby start at a different level with a known quantity of sub-image camera angles and/or resolutions.

At operation 704, a first subset of the first group of sub-images is chosen. For example, given twenty sub-images, ten can be chosen, such as one from above, one from below, and two from each side (right, left, front and back) at different angles per side.

Operation 706 represents combining the current set of sub-images to generate a candidate image at the current neural network level (compression pass). Operation 708 compares the candidate image with the original image to see if the specified loss data is met, e.g., the loss/reduction in quality is less than or equal to a percentage, which can be very near zero or actually zero for "lossless" compression. If met, the process continues to FIG. 8 as described below.

If the loss data/quality is not met, operation 708 branches to operation 712 which evaluates whether there are more sub-images available so as to attempt a retry at the same level using more sub-images. If so, operation 714 increases the number of sub-images in the group of sub-images to try. Note that it is feasible to substitute one or more sub-images for other sub-image(s), although in general, increasing the number tends to increase the candidate image quality. It is also feasible to perform some image processing on the candidate image to determine which sub-images to add to the group; e.g., the right side is blurry, so increase the number of right side sub-images in the group. Further note that the number can be increased by more than one, e.g., modify the group of sub-images to fifteen from ten, then (if needed) to twenty from fifteen, and so on until no more sub-images can be added.

In the event that the sub-image limit is reached, e.g., there were twenty sub-images taken and all twenty were used, operation 712 branches to operation 716, which evaluates the neural network level limit, e.g., sixteen. If not at that highest level, operation 718 increases the level, and uses the higher level in an additional compression pass to again process a selected subset of sub-images into a candidate image for evaluation. If instead the highest level was reached without a candidate image being selected, operation 720 can capture one or more additional images, and the process can be repeated. Note that the level limit number can be changed, e.g., only try up to four levels/compression passes before capturing more sub-images, then when more are captured try up to eight levels before capturing more sub-images, and so on up to a final level limit.

Figure 8:
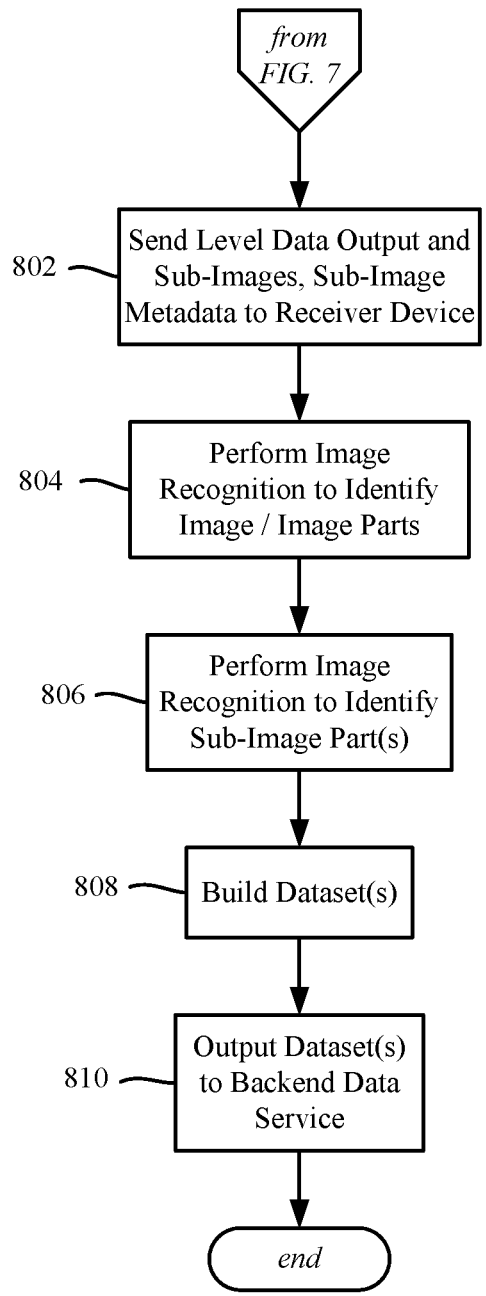

In the event that a candidate image meets the specified quality/resolution criteria, operation 802 of FIG. 8 sends the neural network level data (comprising information as to how many compression levels/how to decompress), the sub-images in the group that worked, and their sub-image metadata to the receiver device. Operations 804-810, which are optional, represent sending information to the data service 128 (FIGS. 1 and 5). For example, the original image parts thereof can be recognized (operation 804), sub-images/parts thereof can be recognized (operation 806) and so on to build one or more datasets (operation 808) that can be stored (operation 810) and accessed for subsequent compression/decompression tasks.

Figure 9:
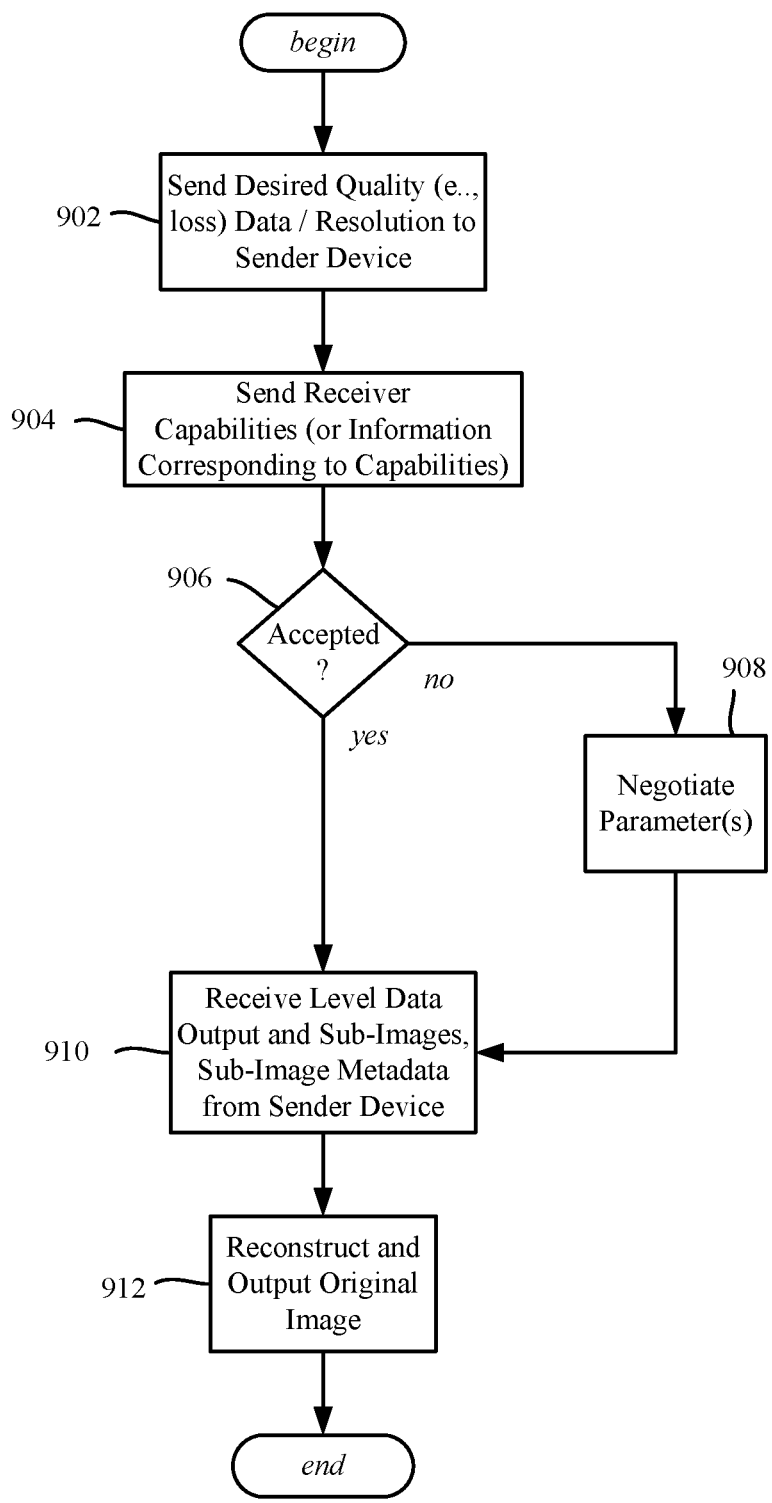
FIG. 9 is a flow diagram representing example operations related to image decompression, in accordance with various aspects and embodiments of the subject disclosure.

FIG. 9 shows the receiver device operations, (generally corresponding to the sender device's operations of FIG. 6). Operation 902 represents the receiver sending a desired quality/loss level that the reconstructed image is to meet, with operation 904 representing sending the receiver capabilities, (or information such as device model type from which the receiver capabilities can be obtained), to the sender device. The data of these operations can be sent in a single communication. If at operation 906 the sender accepts the proposed criteria, the process continues to operation 910; otherwise the sender and receiver need to negotiate new parameters (operation 908) to obtain a specified quality/loss level.

Once the specified quality/loss level is agreed upon, operation 910 represents the receiver device receiving the level data output and sub-images, sub-image metadata from the sender device. Operation 912 uses this information to reconstruct the original image, and output it in some way, e.g., to a display device, save to a file or the like. Note that because of the information sent by the sender device, the receiver device does not require any trial and error operations to reconstruct the original image.

Figure 10:
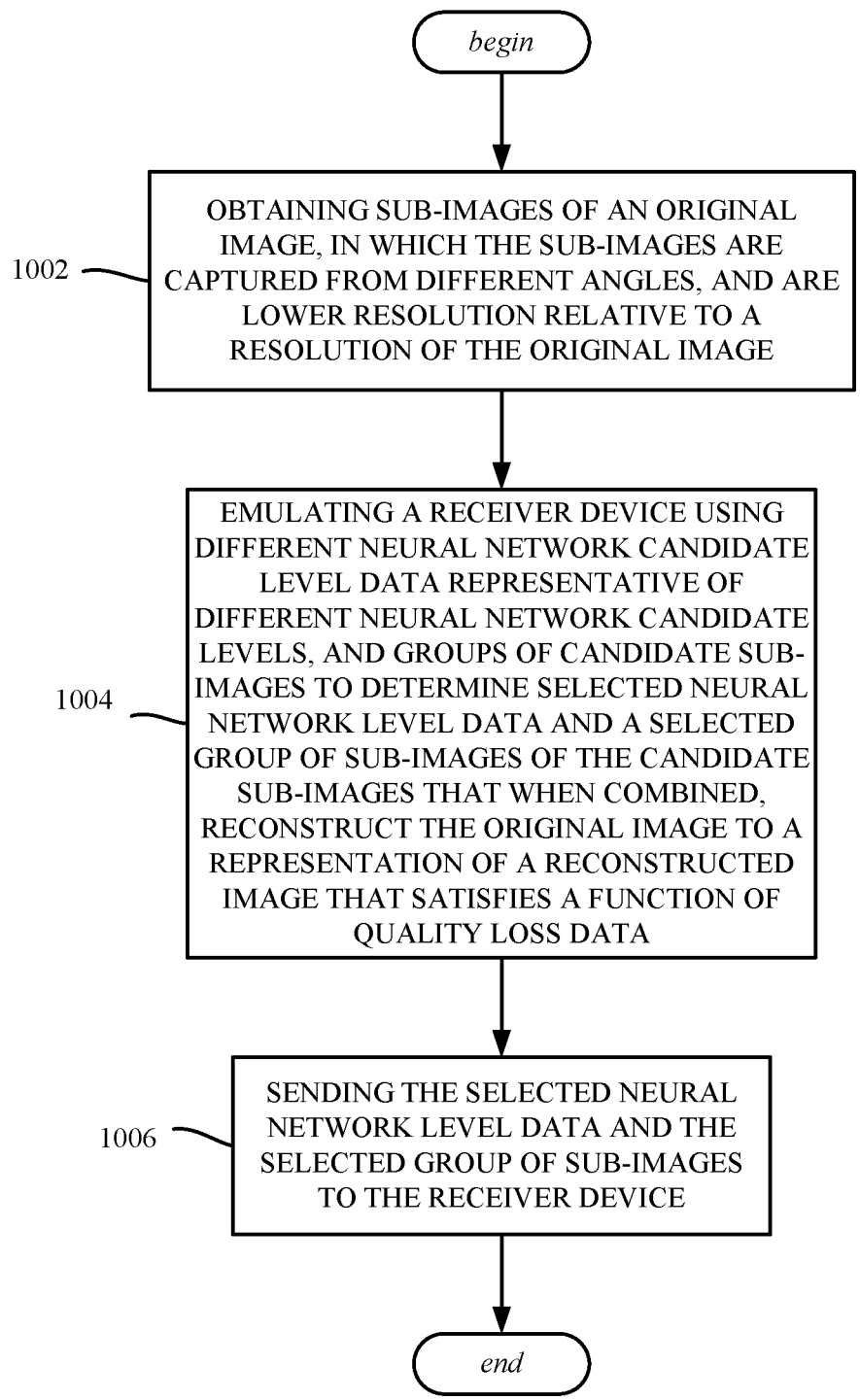
FIG. 10 is a flow diagram representing example operations related to image compression, in accordance with various aspects and embodiments of the subject disclosure.

One or more example aspects are represented in FIG. 10, and can correspond to a system, including a processor, and a memory that stores executable instructions that, when executed by the processor of the system, facilitate performance of operations. Example operation 1002 represents obtaining sub-images of an original image, in which the sub-images are captured from different angles, and are lower resolution relative to a resolution of the original image. Operation 1004 represents emulating a receiver device using different neural network candidate level data representative of different neural network candidate levels, and groups of candidate sub-images to determine selected neural network level data and a selected group of sub-images of the candidate sub-images that when combined, reconstruct the original image to a representation of a reconstructed image that satisfies a function of quality loss data. Operation 1006 represents sending the selected neural network level data and the selected group of sub-images to the receiver device.

Obtaining the sub-images of the original image comprises obtaining pictures of the original image taken at different angles Obtaining the sub-images of the original image comprises obtaining pictures of the original image taken at different resolutions Sending the selected neural network level data and the selected group of the sub-images to the receiver device comprises sending reconstruction data associated with the sub-images of the selected group to the receiver device.

Further operations can comprise obtaining at least one of: receiver-specified quality loss data representative of a quality associated with a receiver device with respect to receiving image data representing three-dimensional images, or image reconstruction capability data representative of an image reconstruction capability of the receiver device.

Emulating the receiver device using the groups of candidate sub-images can comprise increasing a number of candidate sub-images in a group of the candidate sub-images for a neural network candidate level.

Emulating the receiver device using the different neural network candidate level data can comprise increasing the neural network candidate level data from a first level to a second level higher than the first level.

Further operations can comprise performing image recognition on the original image to obtain an identifier of the original image, and outputting the identifier of the original image, the quality loss data, the selected neural network level data and sub-image group information representing the selected group of sub-images to a data store.

Further operations can comprise performing image recognition on the original image to obtain an identifier of an object in the original image, and outputting the identifier of the object to a data store.

Further operations can comprise accessing a data store to determine initial neural network candidate level data representative of an initial neural network candidate level and sub-image group information representing an initial group of candidate sub-images for use in emulating the receiver device.

Figure 11:
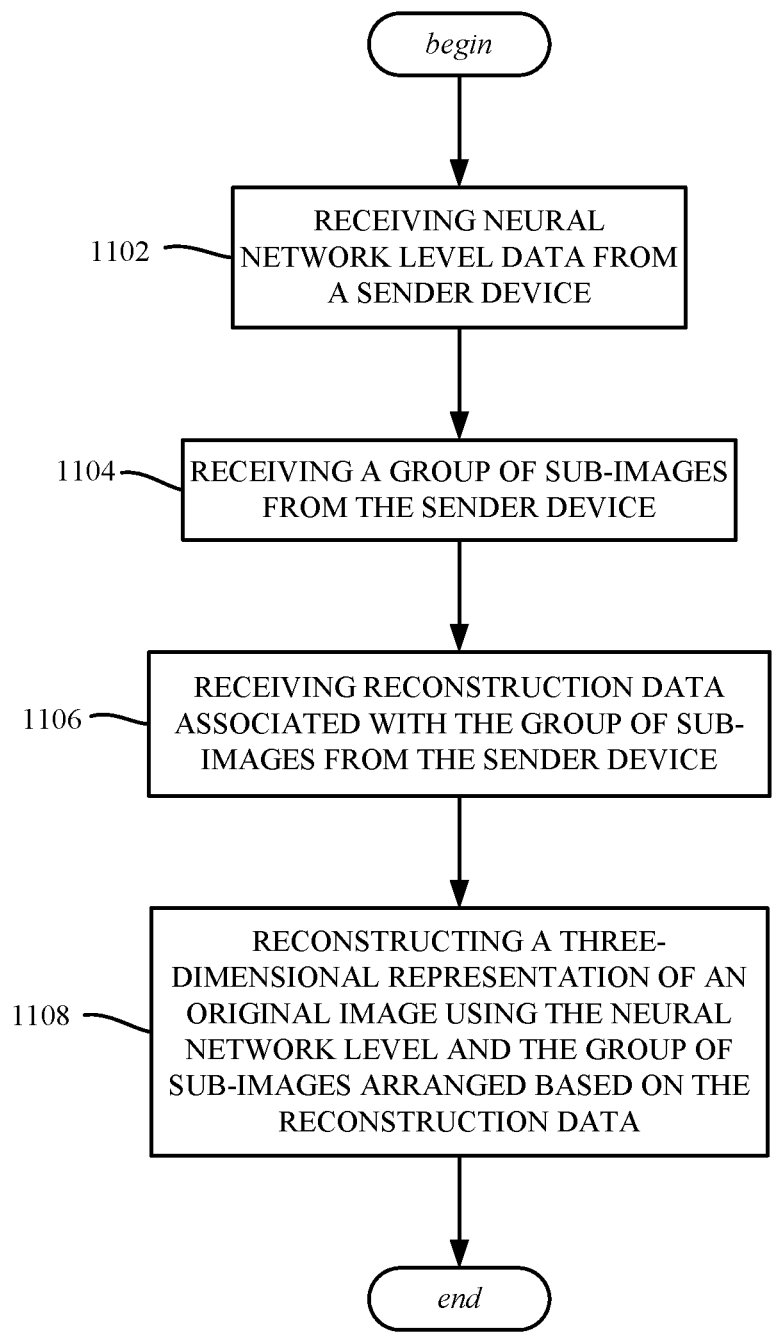
FIG. 11 is a flow diagram representing example operations related to image decompression, in accordance with various aspects and embodiments of the subject disclosure.

One or more example aspects are represented in FIG. 11, and can correspond to a system, including a processor, and a memory that stores executable instructions that, when executed by the processor of the system, facilitate performance of operations. Example operation 1102 represents receiving neural network level data from a sender device. Operation 1104 represents receiving a group of sub-images from the sender device. Operation 1106 represents receiving reconstruction data associated with the group of sub-images from the sender device. Operation 1108 represents reconstructing a three-dimensional representation of an original image using the neural network level and the group of sub-images arranged based on the reconstruction data.

The reconstruction data can comprise angle data associated with arrangement of the sub-images of the group of sub-images.

The reconstruction data can comprise overlay data associated with overlay of the sub-images of the group of sub-images.

Further operations can comprise sending, to the sender device, defined quality loss data representative of a quality loss applicable to the reconstructing of the three-dimensional representation relative to the original image.

Further operations can comprise sending, to the sender device, defined image reconstruction capability data representative of an image reconstruction capability associated with the reconstructing.

Further operations can comprise relating object data in a sub-image of the group of sub-images to an identified object, assigned an object identifier, in the three-dimensional representation, and outputting object information corresponding to the object data and the identifier of the identified object to a data store.

Figure 12:
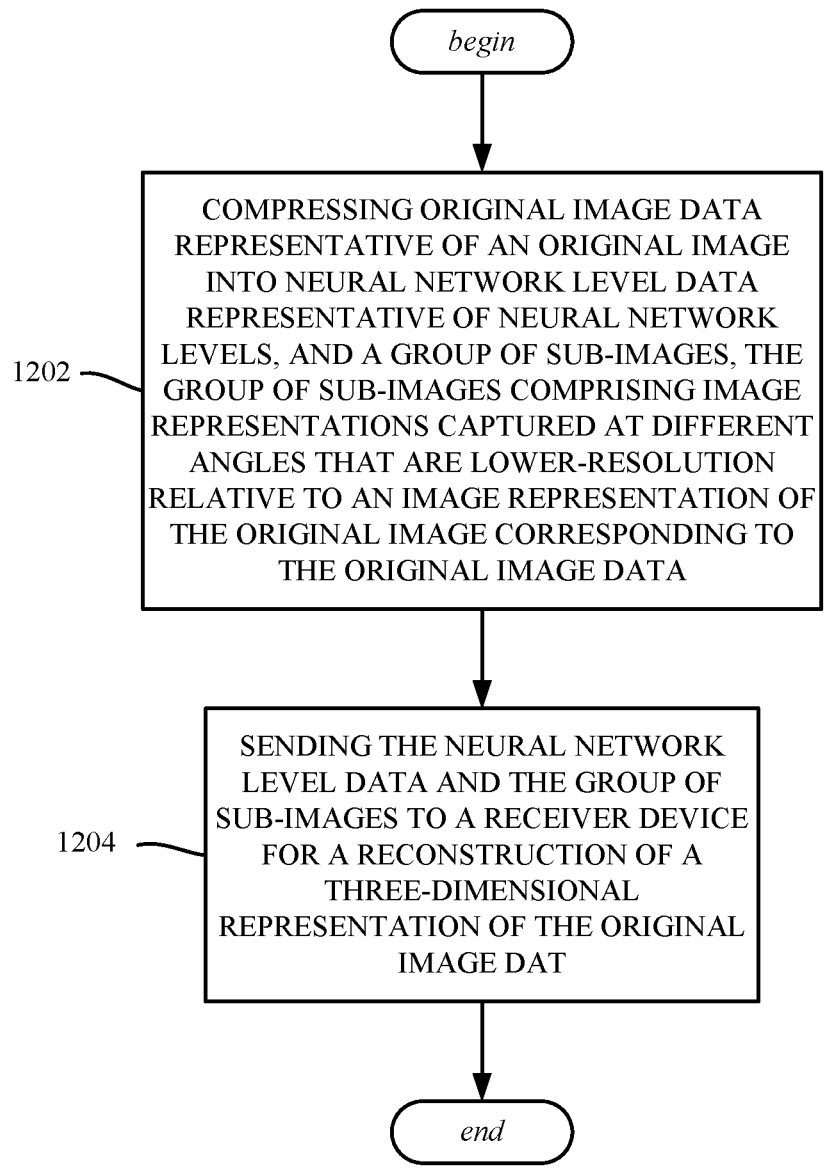
FIG. 12 is a flow diagram representing example operations related to image compression, in accordance with various aspects and embodiments of the subject disclosure.

One or more aspects are represented in FIG. 12, such as implemented in a machine-readable medium, including executable instructions that, when executed by a processor, facilitate performance of operations. Example operation 1202 represents compressing original image data representative of an original image into neural network level data representative of neural network levels, and a group of sub-images, the group of sub-images comprising image representations captured at different angles that are lower-resolution relative to an image representation of the original image corresponding to the original image data. Operation 1204 represents sending the neural network level data and the group of sub-images to a receiver device for a reconstruction of a three-dimensional representation of the original image data.

Compressing the original image data can comprise emulating the receiver device to determine the neural network level data and the group of sub-images based on a reconstructed image that satisfies a quality loss specification by the receiver device.

Emulating the receiver device can comprise evaluating candidate reconstructed images, obtained via combinations of candidate groups of sub-images and candidate neural network level data, to determine the reconstructed image that satisfies the resolution loss specification.

Further operations can comprise obtaining an identifier of the original image, and outputting the identifier of the original image, the selected neural network level data and information representing the selected group of sub-images to a data store.

As can be seen, the technology described herein provides for image compression and decompression, in which the amount of transmitted data is reduced relative to existing technologies. As a result, less bandwidth is consumed when sending 3D images and other high resolution video frames.

Figure 13:
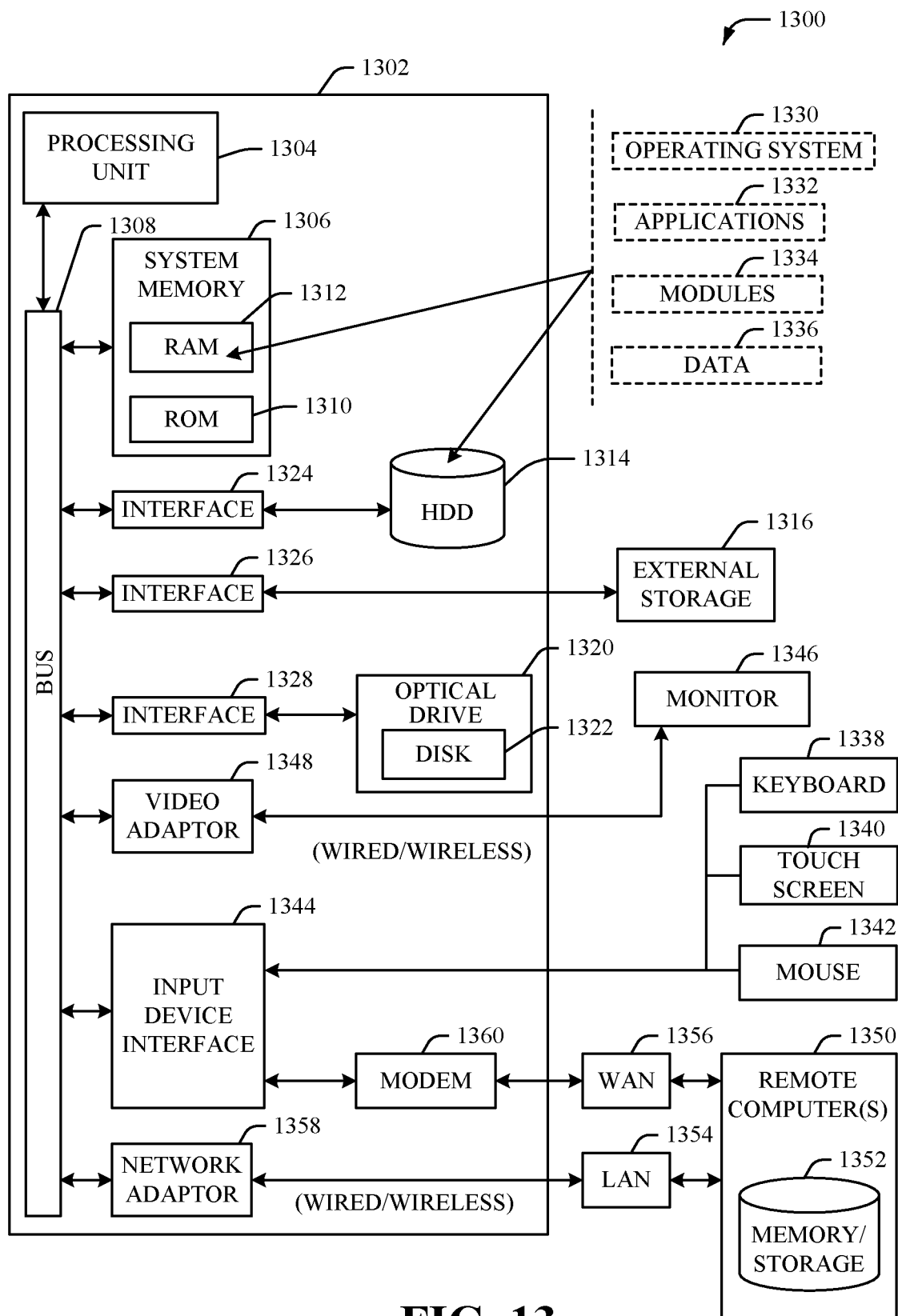
FIG. 13 illustrates an example block diagram of an example computer/machine system operable to engage in a system architecture that facilitates wireless communications according to one or more embodiments described herein.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD), non-volatile memory and other storage technology could be used in addition to, or in place of, an HDD 1314, and can be internal or external. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally include emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can include one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 994 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 7 GHz radio bands, at an 13 Mbps (802.11b) or 74 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any datastream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
    a processor; and
    a memory that stores executable instructions that, when executed by the processor, facilitate performance of operations, the operations comprising:
        obtaining sub-images of an original image, in which the sub-images are captured from different angles, and are lower resolution relative to a resolution of the original image;
        emulating a receiver device using different neural network candidate level data representative of different neural network candidate levels, and groups of candidate sub-images to determine selected neural network level data and a selected group of sub-images of the candidate sub-images that when combined, reconstruct the original image to a representation of a reconstructed image that satisfies a function of quality loss data; and
        sending the selected neural network level data and the selected group of sub-images to the receiver device.

2. The system of claim 1, wherein obtaining the sub-images of the original image comprises obtaining pictures of the original image taken at different angles.

3. The system of claim 2, wherein obtaining the sub-images of the original image comprises obtaining pictures of the original image taken at different resolutions.

4. The system of claim 1, wherein sending the selected neural network level data and the selected group of the sub-images to the receiver device comprises sending reconstruction data associated with the sub-images of the selected group to the receiver device.

5. The system of claim 1, wherein the operations further comprise obtaining at least one of: receiver-specified quality loss data representative of a quality associated with a receiver device with respect to receiving image data representing three-dimensional images, or image reconstruction capability data representative of an image reconstruction capability of the receiver device.

6. The system of claim 1, wherein emulating the receiver device using the groups of candidate sub-images comprises increasing a number of candidate sub-images in a group of the candidate sub-images for a neural network candidate level.

7. The system of claim 1, wherein emulating the receiver device using the different neural network candidate level data comprises increasing the neural network candidate level data from a first level to a second level higher than the first level.

8. The system of claim 1, wherein the operations further comprise performing image recognition on the original image to obtain an identifier of the original image, and outputting the identifier of the original image, the quality loss data, the selected neural network level data and sub-image group information representing the selected group of sub-images to a data store.

9. The system of claim 1, wherein the operations further comprise performing image recognition on the original image to obtain an identifier of an object in the original image, and outputting the identifier of the object to a data store.

10. The system of claim 1, wherein the operations further comprise accessing a data store to determine initial neural network candidate level data representative of an initial neural network candidate level and sub-image group information representing an initial group of candidate sub-images for use in emulating the receiver device.

11. A system, comprising:
    a processor; and
    a memory that stores executable instructions that, when executed by the processor, facilitate performance of operations, the operations comprising:
        receiving neural network level data from a sender device;
        receiving a group of sub-images from the sender device;
        receiving reconstruction data associated with the group of sub-images from the sender device; and
        reconstructing a three-dimensional representation of an original image using the neural network level and the group of sub-images arranged based on the reconstruction data.

12. The system of claim 11, wherein the reconstruction data comprises angle data associated with arrangement of the sub-images of the group of sub-images.

13. The system of claim 12, wherein the reconstruction data comprises overlay data associated with overlay of the sub-images of the group of sub-images.

14. The system of claim 11, wherein the operations further comprise sending, to the sender device, defined quality loss data representative of a quality loss applicable to the reconstructing of the three-dimensional representation relative to the original image.

15. The system of claim 11, wherein the operations further comprise sending, to the sender device, defined image reconstruction capability data representative of an image reconstruction capability associated with the reconstructing.

16. The system of claim 11, wherein the operations further comprise relating object data in a sub-image of the group of sub-images to an identified object, assigned an object identifier, in the three-dimensional representation, and outputting object information corresponding to the object data and the identifier of the identified object to a data store.

17. A non-transitory machine-readable medium, comprising executable instructions that, when executed by a processor, facilitate performance of operations, the operations comprising:

compressing original image data representative of an original image into neural network level data representative of neural network levels, and a group of sub-images, the group of sub-images comprising image representations captured at different angles that are lower-resolution relative to an image representation of the original image corresponding to the original image data; and sending the neural network level data and the group of sub-images to a receiver device for a reconstruction of a three-dimensional representation of the original image data.

18. The non-transitory machine-readable medium of claim 17, wherein compressing the original image data comprises emulating the receiver device to determine the neural network level data and the group of sub-images based on a reconstructed image that satisfies a quality loss specification by the receiver device.

19. The non-transitory machine-readable medium of claim 18, wherein emulating the receiver device comprises evaluating candidate reconstructed images, obtained via combinations of candidate groups of sub-images and candidate neural network level data, to determine the reconstructed image that satisfies the resolution loss specification.

20. The non-transitory machine-readable medium of claim 17, wherein the operations further comprise obtaining an identifier of the original image, and outputting the identifier of the original image, the selected neural network level data and information representing the selected group of sub-images to a data store.

\* \* \* \* \*